Dec. 15, 1931.  N. A. WAHLBERG  1,836,999
TRANSMISSION LINE DEVICE
Filed Aug. 11, 1927
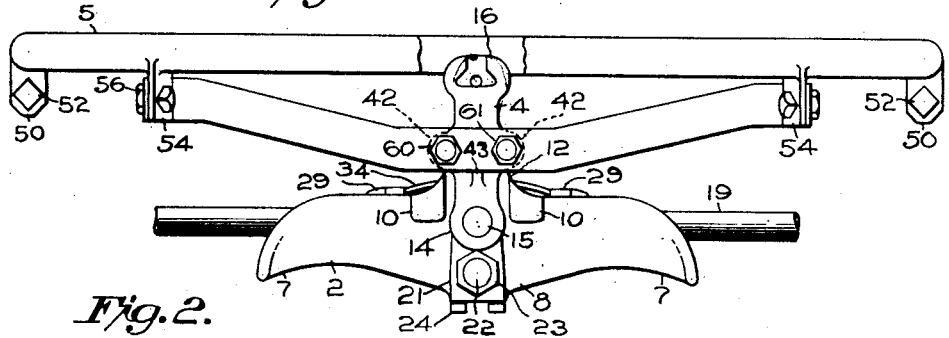
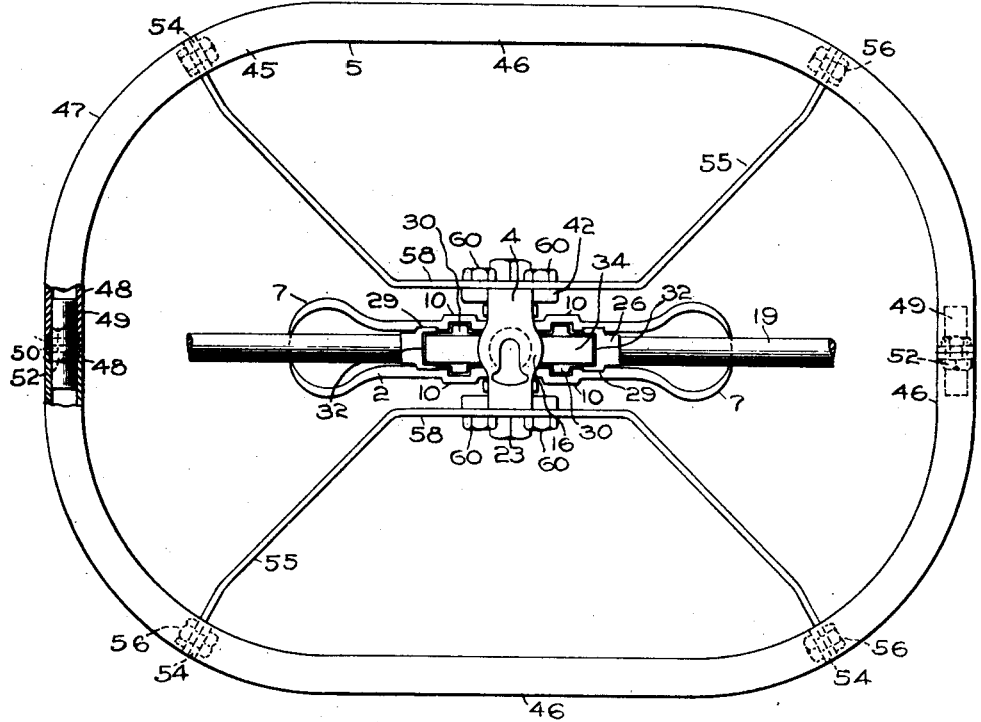
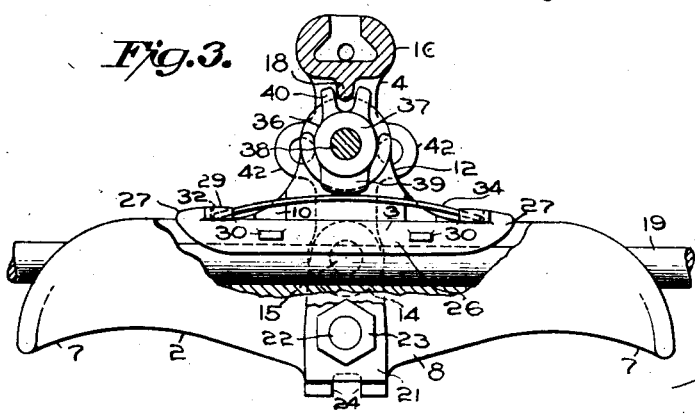
INVENTOR
Nils A. Wahlberg
BY
ATTORNEY Patented Dec. 15, 1931

1,836,999

UNITED STATES PATENT OFFICE

NILS A. WAHLBERG, OF WILKINSBURG, PENNSYLVANIA, ASSIGNOR TO WESTINGHOUSE ELECTRIC & MANUFACTURING COMPANY, A CORPORATION OF PENNSYLVANIA

TRANSMISSION LINE DEVICE

Application filed August 11, 1927. Serial No. 212,197.

My invention relates to transmission-line devices and particularly to suspension clamps for supporting conductors in combination with electrostatic-field-controlling means associated with high-voltage insulators.

One object of my invention is to provide a device of the above-indicated character in which an electrostatic-field-controlling element, such as an arcing horn or ring, shall be substantially free from vibrations caused by movement of the conductor.

Another object of my invention is to provide a suspension clamp that shall embody a yoke structure adapted for the reception of an electrostatic-field-controlling device and a controlling device for cooperating with the yoke.

Another object of my invention is to provide an annular or ring-like electrostatic-field-controlling device that shall so comprise straight and curved sections and that shall be otherwise so constructed as to greatly facilitate its manufacture and mounting in operative position.

Another object of my invention is to provide a transmission-line device that shall be simple and durable in construction, economical to manufacture and effective in its operation.

Heretofore, it has been suggested to provide a transmission-line suspension clamp that, instead of being permanently secured to the conductor under all operating conditions, shall automatically release the conductor under abnormal conditions, such as the breaking of the conductor, to prevent the imposition of undue stresses upon the adjacent insulator and tower supporting parts.

A clamp is also known to me in which a suspension element is relatively movably related to a conductor-receiving member therefor in a center of relative movement that is substantially coincident with a center of movement of the conductor, whereby oscillations of the line are permitted to pass substantially uninterruptedly through the clamp to prevent the imposition of forces on the insulator and other adjacent parts during the normal operation of the device.

However, so far as I am aware, neither of the above-mentioned devices is particularly adapted for the reception of an arcing ring or other electrostatic-field-controlling device by any usual or ordinary means.

It is my aim to overcome this objection by providing a means whereby the field-controlling device may be expeditiously mounted on a clamp having one or both of the above-mentioned characteristics, whereby the controlling device is maintained in a different condition of operation from any similar controlling device heretofore employed.

It is also one of my aims to provide an electrostatic-field-controlling device that shall be of materially economized construction and shall have other features of improvement over similar devices heretofore employed.

Accordingly, in practicing my invention, I provide a clamp suspension element and an electrostatic-field-controlling device that are individually so constructed and so adapted for cooperation with each other as to materially improve the several parts, facilitate their manufacture and obtain an assembled structure of improved character.

Figure 1 of the accompanying drawings is a side view of a transmission-line device constructed in accordance with my invention.

Fig. 2 is a top plan view of the device shown in Fig. 1, portions being broken away for clearness, and Fig. 3 is a view similar to a portion of Fig. 1 showing a clamp thereof, portions of which are broken away, and the electrostatic-field-controlling device thereof removed for clearness.

The device comprises, in general, a conductor-receiving or channel member 2, a clamp structure 3 therefor, a yoke or an element 4 for suspending the channel member 2 and cooperating with the clamping structure 3, and an electrostatic-field-controlling device 5.

The channel member 2, preferably constructed of a single integral metal casting, comprises flared end portions 7, a slightly depending lower central portion 8, two pairs of laterally-projecting, vertically-recessed portions 10 and clevis portions 12 projecting upwardly from the upper edges thereof.

The yoke member 4 comprises bearing portions 14, adjacent to its free ends, for the reception of trunnions 15, and a mounting portion 16, such as a usual socket for the reception of a ball-ended pin, having a depending central projection 18 for a purpose to be hereinafter set forth.

The trunnions 15 are disposed on opposite sides of a conductor 19 in the channel member 2, with the axes thereof aligned and substantially transverse of the longitudinal axis of the conductor 19, whereby the yoke 4 and the channel member 2, which are pivotally connected by the trunnions, have a center of movement substantially coincident with a center of movement of the conductor.

The trunnions 15 are supported in the above-mentioned position by link-like members 21 which depend therefrom along the sides of the channel member 2 and have openings opposite registering apertures in the depending portion 8 of the channel member for the reception of a bolt 22 that is held in position, as by a nut 23. Lugs 24, on the channel member 2, cooperate with the links 21 to prevent rotative movement thereof about the axis of the bolt 22.

The clamp structure 3 comprises an elongated clamping shoe member 26 having a slightly grooved longitudinal under-surface for engagement with the conductor 19, and flared ends 27 that, similarly to the flared ends 7 of the channel member 2, assist in preventing local concentrated bending stresses in the conductor 19 adjacent to these flared ends. The clamping shoe member is also provided with laterally-projecting lugs 29 adjacent to its ends for limiting its downward movement in the channel 2, and also with laterally projecting side lugs 30 for cooperation with the recessed portions 10 in the channel member 2, to position the clamp member 26 longitudinally of the conductor 19. The clamping member 26 is further provided with shoulders 32 adjacent to its ends to retain a leaf or a strap-steel spring 34 which is mounted thereon in outwardly bowed relation thereto by having its ends sprung against the shoulders 32.

A cam member 36, having a central apertured boss portion 37, by which it is held in position between the clevis portions 12, by means of a pin 38, is provided with a depending cam portion 39 for engagement with the spring 34, and also with upwardly diverging arms 40 for disposal at the sides of the projection 18 on the yoke 4.

In assembling the structure, as so far described, the conductor 19 is passed between the clevis portions 12 to the position in the channel member shown, after which the clamp member 26, bearing the spring 34, and the cam member 36 are placed in position, as shown, in the order named.

In the above positions of the parts, the cam member 36 may be turned to the clamping position shown or the turning movement of the cam member may be effected by the projection 18 on the yoke member 4 after the mounting of the latter.

The trunnions 15 are preferably rigidly secured to the links 21, which are connected to the legs of the yoke by means of the trunnions and secured in the positions illustrated by the bolt 22.

In operation, since the trunnions 15 have axes substantially transverse of the axis of the conductor 19, the oscillations of the conductor 19 permit the channel member 2 to rock therewith, thus removing from the yoke 4 and any element, such as the structure 5 connected thereto, undue vibration tending to damage or otherwise adversely affect these parts. Thus, a series-string suspension insulator and its supporting tower, which are connected to the device through the socket portion 16, are also rendered relatively free from vibrations.

In clamps of ordinary construction, the supporting means, corresponding to the trunnions 15, is usually laterally offset with respect to the conductor, so that longitudinal oscillations of the line tend to cause it to move violently about the center corresponding to the axes of the trunnions 15 of applicant's device.

When the insulator string swings through a considerable angle from its normally substantially vertical position, as caused by breaking of the conductor 19, the yoke member 4 moves a sufficient distance about the axis of the trunnions 15 to cause the projection 18 to engage one of the arms 40, thereby turning the cam member 36 to release the clamping structure 3 from the conductor 19 and to permit the latter to slip through the clamp. When the laterally deflecting force on the structure has been sufficiently reduced, the clamping parts tend to resume their normal clamping positions and this tendency causes a snubbing or retarding action against further slipping of the conductor. Also, the arms 40 are sufficiently spaced from the projection 18 to permit the channel member 2 to swing slightly about the trunnions 22 in response to slight oscillations of the conductor 19 occurring under ordinary conditions of service, without permitting the projection 18 to affect the clamping action of the cam member 36 by engagement with the arms 40.

Since space and other considerations render it difficult to mount the field-controlling device 5 by any of the usual and well-known methods, the space between the legs of the yoke being substantially filled, the legs of the yoke 4 are provided with apertured lugs 42 projecting laterally therefrom, substantially parellel to the conductor 19 and lugs or seating portions 43 on the outer surfaces of the yoke.

The electrostatic-field-controlling device 5 has a main body or arc-assuming portion 45 of annular or ring-like character and of substantially oblong shape, having its major axis extending substantially parallel to the conductor 19.

The member 45 is also divided or halved along its major axis into straight and curved sections 46 and 47, respectively, having cylindrical adjacent ends 48 spanned by cylindrical reinforcing elements 49 therein. Portions 50 of flat strap-like character are disposed adjacent to the ends 48, as by welding to the member 45, in adjacent flat-surface relation and having apertures for the reception of connecting bolts 52.

Flat strap-like lugs or elements 54 are similarly disposed and connected relatively to the half sections of the member 45 intermediate the ends thereof for attachment to supporting portions 55 of substantially U-shape having the free ends thereof connected to the lugs 54, as by bolts 56, and the closed ends 58 thereof extending substantially parallel to the conductor 19 on either side of the clamp for seating on the lugs 43 and attachment to the clamp, as by bolts 60.

By having the electrostatic-field-controlling device 5 mounted on the yoke 4, the relatively movable parts of the clamp are stabilized and better balanced and the device 5 is prevented from distortion which sometimes occurs to such an extent in ordinary devices of this kind, as a result of vibration, as to render the field-controlling device substantially useless.

Having the portion 45 of substantially oblong shape with straight sections causes it to more nearly conform to the electrostatic field, as affected by the conductor 19, than a circular ring, facilitates its manufacture, permits a standard stock element 49 to be employed for connecting the sections and provides other features of advantage.

While I have shown and described a particular form of my invention, changes may be effected therein without departing from the spirit and scope thereof as set forth in the appended claims.

I claim as my invention:

1. An electrostatic-field-control device comprising an arc-assuming member of substantially loop-shape and supporting means including rod-like elements spaced from each other and each subtending a section of the perimeter of the loop with its ends secured to the loop, said elements having adjacent spaced intermediate portions for co-operative mounting on a support in the space therebetween.

2. An electrostatic-field-control device comprising an arc-assuming member of substantially loop-shape and supporting means including rodlike elements of substantially U-shape viewed parallel to the axis of the loop each subtending a section of the perimeter of the loop with its ends secured to the loop at the ends of said section, said elements having adjacent spaced intermediate portions for co-operative mounting on a support in the space therebetween.

3. An electrostatic-field-control device comprising an arc-assuming member of substantially loop-shape and supporting means including rod-like elements of substantially U-shape viewed parallel, and at right angles, to the axis of the loop each subtending a section of the perimeter of the loop with its ends secured to the loop at the ends of said section, said elements having adjacent spaced intermediate portions for co-operative mounting on a support in the space therebetween.

4. An electrostatic-field-control device comprising an arc-assuming member of substantially loop-shape and supporting means including a rod-like element connected to and subtending a section of the perimeter of the loop, said element being disposed entirely at one side of the axis of the loop in substantially spaced relation to said axis.

In testimony whereof, I have hereunto subscribed my name this 4th day of August, 1927.

NILS A. WAHLBERG.